United States Patent [19]

Deabriges

[11] 4,314,979
[45] Feb. 9, 1982

[54] INDUSTRIAL PROCESS FOR CONTINUOUS PRODUCTION OF ZEOLITE A

[75] Inventor: Jean Deabriges, Aix en Provence, France

[73] Assignee: PCUK Produits Chimiques Ugine Kuhlmann, Courbevoie, France

[21] Appl. No.: 105,273

[22] Filed: Dec. 19, 1979

Related U.S. Application Data

[63] Continuation of Ser. No. 922,341, Jul. 6, 1978, abandoned.

[30] Foreign Application Priority Data

Jul. 29, 1977 [FR] France ............................... 77 23373

[51] Int. Cl.$^3$ .......................................... C01B 33/28
[52] U.S. Cl. .................................... 423/329; 423/328
[58] Field of Search ............................. 423/328–330; 253/455 Z

[56] References Cited

U.S. PATENT DOCUMENTS

| | | | |
|---|---|---|---|
| 2,882,243 | 4/1959 | Milton | 423/328 |
| 2,904,607 | 9/1959 | Mattox et al. | 423/328 X |
| 3,055,841 | 9/1962 | Gladrow et al. | 252/455 Z |
| 3,058,805 | 10/1962 | Weber | 423/329 |
| 3,071,434 | 1/1963 | Frilette et al. | 423/329 |
| 3,425,800 | 2/1969 | Hirsh | 423/329 |
| 4,041,135 | 8/1977 | Williams et al. | 423/329 |
| 4,055,622 | 10/1977 | Christophliemk et al. | 423/329 X |
| 4,072,622 | 2/1978 | Kuhling et al. | 423/328 X |

FOREIGN PATENT DOCUMENTS

| | | |
|---|---|---|
| 667680 | 5/1962 | Belgium . |
| 2517218 | 10/1976 | Fed. Rep. of Germany . |
| 831076 | 3/1960 | United Kingdom . |
| 1060794 | 3/1967 | United Kingdom . |
| 1115489 | 5/1968 | United Kingdom . |
| 1399598 | 7/1975 | United Kingdom . |
| 1476957 | 6/1977 | United Kingdom . |
| 1477557 | 6/1977 | United Kingdom . |
| 1498213 | 1/1978 | United Kingdom . |
| 1517323 | 7/1978 | United Kingdom . |
| 1525775 | 9/1978 | United Kingdom . |
| 1525782 | 9/1978 | United Kingdom . |
| 2002335 | 2/1979 | United Kingdom . |
| 1548152 | 7/1979 | United Kingdom . |

*Primary Examiner*—Edward J. Meros
*Attorney, Agent, or Firm*—Pennie & Edmonds

[57] ABSTRACT

A process for continuous preparation of zeolite A of constant and homogeneous quality, consisting of instantly and continously mixing a sodium silicate solution and a sodium aluminate solution in the correct proportions and at an elevated temperature followed by transfer of the resulting slurry to a crystallization reactor. The product is recovered from the crystallization reactor washed and dried.

6 Claims, 2 Drawing Figures

INDUSTRIAL PROCESS FOR CONTINUOUS PRODUCTION OF ZEOLITE A

This is a continuation of application Ser. No. 922,341, filed July 6, 1978, now abandoned.

BACKGROUND OF THE INVENTION

1. Field of the Invention

The present invention relates to a continuous industrial process for the preparation of zeolites, particularly zeolite A by continuously and instantly mixing a sodium silicate solution and a sodium aluminate solution. The concentration of these solutions and the proportions are carefully controlled. The solutions are mixed at an elevated temperature and the slurry transferred to a crystallization reactor. The product is recovered from the crystallization reactor, washed and dried.

2. Description of the Prior Art

Application of zeolites are based on their well known properties as cation exchangers, described for example in "Comprehensive Treatise on Inorganic and Theoretical Chemistry," by J. W. Mellor, vol. VI, part 2, Longman Editors, 1925, pp 575-579. These zeolites are used in water treatment and in particular for incorporation into the composition of detergents for the sequestration of the calcium in the wash water.

The most widely used of the zeolites is the zeolite designated zeolite A in U.S. Pat. No. 2,882,243 to Milton. This zeolite has the formula $Na_2O$, $Al_2O_3$, $2\ SiO_2$, $xH_2O$, where x can vary from 1 to 8 depending on the drying conditions of the product. In the most widely used products $x=4$ to 5.

To promote the exchange capacities of $Ca^{++}$ and the selectivity of the zeolite, the latter should be as pure as possible and consequently be well crystallized, any impurity being either inactive or less selective.

The $Na^+$ exchange selectivity by $Ca^{++}$ is also improved by the use of zeolite grains constituted by agglomeration of crystals so that the diameter of the pores is just slightly larger than the diameter of the $Ca^{++}$ ion surrounded by the sphere of the coordinated water molecules.

Finally, when this zeolite is incorporated in a detergent, it is essential that the particle size distribution be restricted to about a median diameter of 2 to 3 microns, sufficiently small to avoid retention of the product in the textile fibers but sufficient to permit an easy solid/liquid separation during fabrication.

Synthesis and the ion exchange properties of synthetic zeolites and in particular zeolite A have been well known for many years (see "Ion Exchange" of Friedrich Helfferich, 1962, McGraw-Hill Book Company, Chapter 2, pages 10-16).

The synthesis processes are all performed in batches by mixing of elements Si, Al and Na brought in as various compounds thus forming a silicoaluminate gel that precipitates. This gel is then crystallized to zeolite A by aging in the mother liquor containing an amount of free soda and soluble alumina compatible with the type of zeolite obtained. Such processes are described, for example, in U.S. Pat. Nos. 2,841,471 and 2,847,280, French Pat. No. 1,404,467 and DAS No. 2,517,219.

These batch precipitation cause considerable variations of the $Na_2O$, $Al_2O_3$ and $SiO_2$ contents of the liquor coming from the mixture. This results in a considerable heterogeneity of the resulting product from the viewpoint of particle size, crystallinity and exchange selectivity (size of the pores).

On the other hand, in all the described processes the crystallization mother liquor, still containing not inconsiderable amounts of soda and alumina, is discarded causing a considerable consumption of raw materials and a considerable pollution.

The applicant has developed a continuous process for preparing zeolite A which remedies these difficulties.

This process is a continuous homogeneous precipitation and crystallization process which makes it possible to obtain a homogeneous and constant quality of the zeolite A product.

SUMMARY OF THE INVENTION

The present invention relates to a continuous method of preparing zeolites, particularly zeolite A by effecting precipitation and crystallization of solutions of sodium silicate and sodium aluminate at a temperature of 40° C. to 90° C. The resulting slurry is moved to a crystallization reactor or reactors, maintained at a temperature of 75° C. to 100° C. The slurry is aged in these reactors until the desired crystallinity is obtained. The crystalline product is recovered, washed and dried.

The invention is illustrated diagramatically in the drawings in which.

Figure 1:
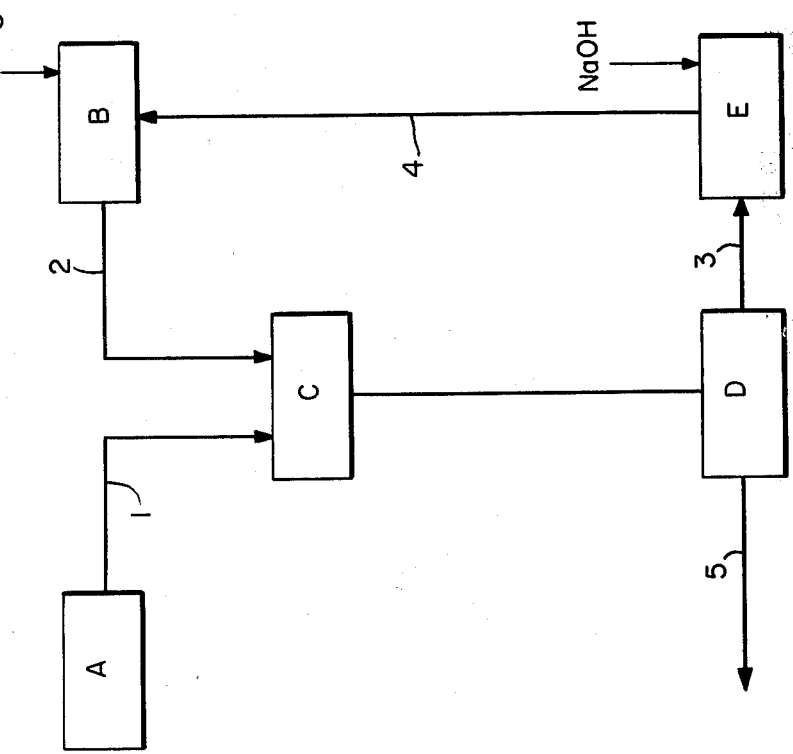
FIG. 1 is a schematic representation of the process.

Referring now to FIG. 1 the sodium silicate solution is prepared in the desired concentration in vessel A and the sodium aluminate solution is prepared from sodium hydroxide and aluminum hydroxide in vessel B. A sodium silicate solution is moved continuously through line 1 and the sodium aluminate solution is moved continuously through line 2 to the mixing reactor C. The resulting slurry is moved to the crystallization reactor or reactors D where it is aged for a period of time sufficient to achieve the desired crystallization. The mother liquor from the crystallizing reactors D contains from 2 to 10 grams per liter of alumina. This liquor is mixed with the wash solutions from the purification of the product and is moved into the vessel E wherein additional sodium hydroxide is added. This solution is moved through line 4 to vessel B where sufficient aluminum hydroxide is added to prepare a sodium aluminate solution having the desired concentration.

Figure 2:
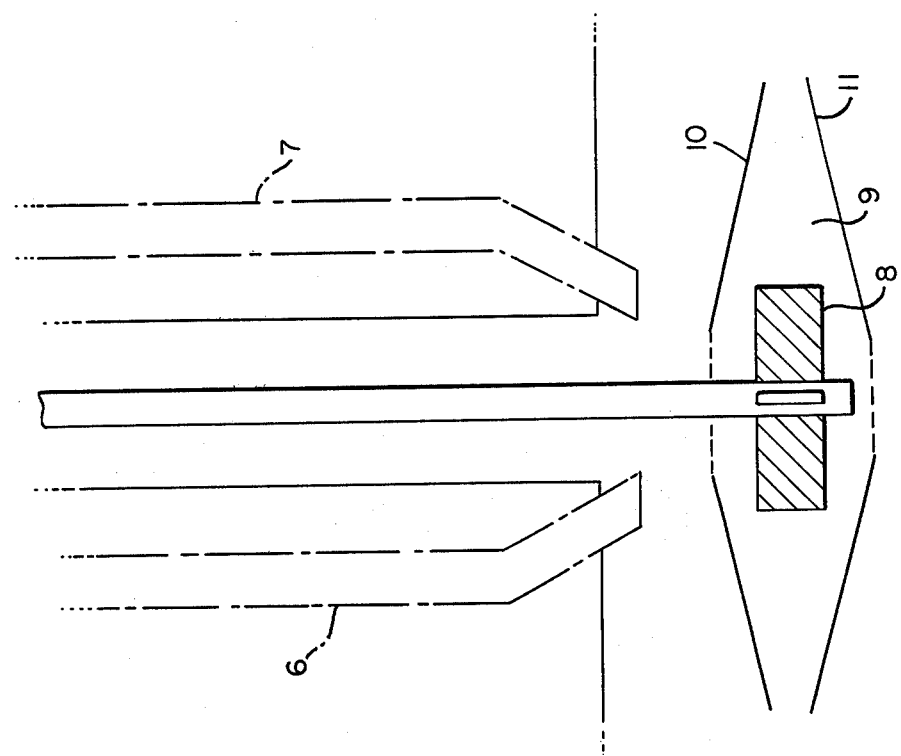
FIG. 2 is a diagramatic representation of the mixing reactor.

Referring now to FIG. 2 which is a diagramatic sketch of the reactor C of FIG. 1. The reactants are moved into the vessel through lines 6 and 7. A turbine 8 is rotated rapidly and the solutions are mixed due to strong suction caused by the turbine. The action of the turbine is increased still more if it is placed in a vessel 9 made up of two plates 10 and 11 that restrict the volume in which the two reaction mixtures are injected or aspirated so that there is never a local excess of silica in relation to the alumina. Such an excess of silica even for a short period of time would cause a degradation of the quality of the product by starting the precipitation and the crystallization of zeolitic materials other than zeolite A.

The process exhibits a great flexibility in use. It is possible to calculate the volume of the reactor as a function of the particle size distribution desired for the final product. An increase in the volume of the reactor causes an increase in the aging time of the silica-alumina suspension which is constantly supplied with silica and alumina and thus results in an increase in the particle size of the product. It can be made more homogeneous by using several reactors rather than the single reactor system shown diagramatically in FIG. 1.

DETAILED DESCRIPTION OF THE INVENTION

The sodium silicate solution prepared in vessel A should contain a minimal amount of excess sodium hydroxide. The molar ratio of $SiO_2$ to $Na_2O$ should be equal to or greater than 2.8. The limits of the concentrations of sodium hydroxide and silica should be as follows:

NaOH: 45 to 105 g/l
$SiO_2$: 120 to 350 g/l

This sodium silicate solution is prepared from silica and sodium hydroxide raw materials that can be varied according to economic criteria. Industrial sodium silicate or silica containing sand and sodium hydroxide, or sodium hydroxide and silica gel recovered from residual fluorosilicic acid from a plant making aluminum fluoride or when the treatment of a gas is released during the treatment of natural phosphates may be used. It is also possible to use the sodium silicate solutions from a plant for the desilication of bauxites before treatment in alumina plants. These solution vary in concentration from 15 to 40 g/l of silica and 65 to 155 g/l of sodium hydroxide. The sodium aluminate solution made up in B may be recycled or may come directly from an alumina plant. The mother liquor and wash solutions from the crystallization reactor D are moved to reactor E as pointed out above and is concentrated by evaporation. The sodium hydroxide necessary to compensate for the loss of sodium hydroxide in formation of zeolite A is added. The solution in reactor E thus contains 90 to 100 g/l of sodium hydroxide, 2 to 12 g/l of $Al_2O_3$, and 0.3 to 0.8 g/l jof silica. This solution is moved to the vessel B where it is mixed with alumina in the form of hydragillite in an amount sufficient to compensate for the loss of alumina precipitated in the zeolite A. The added alumina is solubilized in a series of reactors that are stirred and kept at a temperature of 90° to 120° C. at atmospheric pressure. The solution in vessel B has the following composition:

80 to 110 g/l of sodium hydroxide
50 to 65 g/l of $Al_2O_3$
0.2 to 0.7 g/l of $SiO_2$ After the sodium aluminate and sodium silicate solutions are mixed thoroughly in reactor C they are moved to crystallization reactors indicated generally as D which are stirred and kept at a constant temperature in the range of 75° to 100° C. The aging time in the crystallization reactor is dependent on the desired crystallinity of the product.

The transfer of the product from the crystallization reactor is performed by taking the suspension at the bottom of the reactor so as to preferentially move the most dense and hence the largest particles and thus maintain the homogeneity of the particle size of the product. The product is separated by any suitable solid liquid separation means such as, for example, decanting, filtering, etc. The solid is washed with water and dried. The wash waters are recovered and mixed with the liquid moved into the vessel E.

The conditions for preparing the mixture in the mixing reactor C makes it possible to introduce a very slight excess of alumina in relation to the silica so that the resulting mixture has a molar ratio of alumina to silica of approximately 0.54. As a result the liquor moved from the crystallization reactor has a residual alumina content of 2 to 10 g/l and can be easily resaturated in the vessels E and B and continuously recycled.

The product recovered from the process described above has the following characteristics:

Narrow particle size distribution, 90% of the grains being in a range of 4 microns for a median diameter between 1 and 10 microns that is adjustable as a function of the intended use.

Ion exchange capacity greater than 85 mg $Ca^+$/g of dry product.

The zeolite A is particularly suitable for use in detergents to soften calcium containing waters.

The invention is illustrated by the following specific but nonlimiting examples.

EXAMPLE 1

A sodium silicate solution is prepared from 542 kg of sodium silicate contained in 1,360 kg of industrial liquor and an added amount of water of 1.36 m³.

This solution contains:
$SiO_2$, 329 kg
$Na_2O$, 113 kg
$H_2O$, 2,278 kg

The solution is mixed at C with a sodium aluminate solution that a recycled whose preparation will be described below.

This sodium aluminate solution contains:
$SiO_2$, 3 kg
$Al_2O_3$, 330 kg
$Na_2O$, 480 kg
$H_2O$, 5,700 kg Precipitation and crystallization are performed under the conditions of the description, at a temperature of 90° C. and with a total aging time of 6 hours.

The crystallized solid and resulting liquor are separated by filtration at D.

The solid is washed on the filter with 1,500 kg of water then dried continuously in a screw drier.

There are thus obtained 1,000 kg of crystallized zeolite A containing:
$SiO_2$, 329 kg
$Al_2O_3$, 279 kg
$Na_2O$, 170 kg
$H_2O$, 222 kg 95% of the zeolite grains obtained have a diameter between 1 and 5 microns.

The exchange capacity is 105 mg Ca/g of product.

The liquor separated from zeolite A and the water that washed this zeolite A contains:
$SiO_2$, 3 kg
$Al_2O_3$, 51 kg
$Na_2O$, 423 kg
$H_2O$, 8,500 kg This liquor is concentrated by evaporation, then 57 kg of soda (expressed in $Na_2O$) are added to it to compensate for a loss of the soda precipitated in zeolite A.

A liquor is obtained which contains:
$SiO_2$, 3 kg
$Al_2O_3$, 51 kg
$Na_2O$, 480 kg
$H_2O$, 5,550 kg This liquor is used to dissolve, in vessel B, 279 kg of alumina (expressed in $Al_2O_3$) contained in 516 kg of wet hydrargillite.

This solubilization is performed at 100°–102° C. with a holding time of 1 hour.

The liquor is mixed with the sodium silicate as described above.

EXAMPLE 2

In this example, the raw material bringing in the necessary amount of silica is a very low-cost raw material because it comes from manufacturing recovery.

This siliceous material is a silica gel, ex $H_2SiF_6$, a residue from a shop making aluminum fluoride or a shop treating natural phosphates for preparing phosphates or phosphoric acid.

The sodium silicate solution $L_1$ is therefore prepared by treating 1,180 kg of silica gel containing 329 kg of silica (expressed as $SiO_2$) with 265 kg of a sodium hydroxide containing 113 kg of soda (expressed as $Na_2O$) at 85° C. for 60 minutes.

Diluting with water is then performed to obtain 2.3 m³ of solution which contains:
$SiO_2$, 329 kg
$Na_2O$, 113 kg
$H_2O$, 2,300 kg This solution is mixed at C with the same sodium aluminate solution as that of example 1.

This sodium aluminate solution contains:
$SiO_2$, 3 kg
$Al_2O_3$, 330 kg
$Na_2O$, 480 kg
$H_2O$, 5,700 kg Precipitation, crystallization of the zeolite A, then filtration, washing and drying of the latter are performed under the conditions described in example 1.

Thus, there are obtained 1,000 kg of crystallized zeolite A containing:
$SiO_2$, 329 kg
$Al_2O_3$, 279 kg
$Na_2O$, 170 kg
$H_2O$, 222 kg 95% of the grains obtained have a diameter between 1 and 5 microns.

The exchange capacity is 102 mg Ca/g of product.

EXAMPLE 3

In this example, the siliceous raw material is an industrial Na silicate solution that permits preparation, as in example 1, of a solution containing:
$SiO_2$, 329 kg
$Na_2O$, 113 kg
$H_2O$, 2,278 kg The alumina is introduced in the form of a sodium aluminate liquor taken from an alumina production plant.

Six m³ of this industrial sodium aluminate solution which contains:
$SiO_2$, 2 kg
$Al_2O_3$, 450 kg
$Na_2O$, 480 kg The sodium silicate and sodium aluminate solutions, previously heated to 90° C. are mixed at C. The resulting slurry is crystallized in the mother liquor at a temperature of 95° C. for 3 hours.

The crystallized solid is filtered, then washed with 1,200 kg of hot water. It is then dried continuously in a screw drier.

1,000 kg of zeolite A are thus obtained which contain:
$SiO_2$, 329 kg
$Al_2O_3$, 279 kg
$Na_2O$, 170 kg
$H_2O$, 222 kg 95% of the grains of zeolite A obtained have a diameter between 1 and 6μ.

The exchange capacity is 99 mg Ca/g of product.

The liquor $L_3$, mixture of the mother-liquor and the water having washed the crystallized zeolite, contains:
$SiO_2$, 2 kg
$Al_2O_3$, 171 kg
$Na_2O$, 423 kg
$H_2O$, 3,300 kg This solution is reused in an alumina production plant to which it is returned.

It will be apparent from the foregoing that numerous variations and modifications will become obvious to those skilled in the art and, accordingly, the invention is not to be limited to the essence thereof which has been disclosed.

What is claimed is:

1. A process for the continuous preparation of zeolite A, suitable for use in detergents to soften calcium containing waters, having a constant homogeneity and quality wherein at least about 90 percent of the product has a granulometry within a range of 4 microns and a median diameter between about 1 and about 10 microns is characterized by:

(a) instantaneously and continuously mixing at an elevated temperature in a reaction zone subjected to strong suction:
  (i) a sodium silicate solution prepared from silica and NaOH which contains a minimal excess of NaOH and a $SiO_2/Na_2O$ molar ratio $\geq 2.8$ to 1; and containing about 45 to 105 g/l of NaOH and about 120 to 350 g/l of $SiO_2$;
  (ii) a sodium aluminate solution made from alumina and NaOH having an excess of NaOH solution, and containing about 80 to 110 g/l of NaOH and about 50 to 65 g/l of $Al_2O_3$;

(b) precipitating the zeolite while continuously stirring the resulting solution at an elevated temperature and while restricting the volume of the reaction zone to insure that there is a local excess of dissolved alumina in relation to dissolved silica in the solution; by:
  (i) introducing the sodium silicate and sodium aluminate solutions into the suction zone created by a rapidly rotating turbine; and
  (ii) adjacently surrounding the turbine with plates constructed and arranged to restrict the volume in which the above silicate and aluminate solutions are initially mixed;

(c) continuously removing the precipitated zeolite A and resulting liquor to a crystallization zone;

(d) continuously stirring the resultant precipitate and liquor in the crystallization zone at an elevated temperature until the desired crystallization is obtained;

(e) maintaining the concentration of the liquor in the crystallization zone between about 2 to 10 g/l of $Al_2O_3$;

(f) removing the most dense or larger particles in suspension at the bottom of the crystallization zone; and (g) recovering the zeolite A containing at least about 90 percent of the particles within a range of about 4 microns and having a median diameter between about 1 and 10 microns and an ion exchange capacity greater than 85 mg. $Ca^{++}/g$ of dry product.

2. The process according to claim 1 wherein the separately prepared sodium aluminate solution is in the form of a sodium aluminate liquor taken from an alumina production plant and the liquor from the stirring mixture is returned for use in an alumina production plant.

3. The process according to claim 1 comprising a recycling of the mother liquor which is characterized by continuously:

(a) concentrating the mother liquor sufficient to permit a replenished aluminate solution having substantially the same volume as the prior aluminate solution;

(b) replenishing the NaOH in the mother liquor in an amount sufficient to compensate for the NaOH consumed during the prior crystallization of zeolite A;

(c) charging the mother liquor with alumina in an amount sufficient to compensate for the alumina consumed during the prior crystallization of zeolite A; and (d) mixing the charged mother liquor with the sodium silicate solution as recited in claim 11.

4. The process according to claim 1 or 3 wherein the sodium aluminate solution is saturated with alumina at atmospheric pressure.

5. The process of claim 1 wherein the sodium aluminate solution has a molar ratio for $Al_2O_3/Na_2O$ between 0.35 and 0.65.

6. The process of claim 1 wherein the sodium aluminate solution has a molar ratio for $Al_2O_3/Na_2O$ between 0.41 and 0.57.

* * * * *

UNITED STATES PATENT AND TRADEMARK OFFICE
CERTIFICATE OF CORRECTION

PATENT NO. : 4,314,979
DATED : February 9, 1982
INVENTOR(S) : Jean Deabriges

It is certified that error appears in the above—identified patent and that said Letters Patent is hereby corrected as shown below:

Column 3, lines 38-39, reads "hydragillite", should read --hydrargillite--.

Column 4, line 11, reads "$Ca^+/g$" should read --$Ca^{++}/g$--.

Column 6, line 32 reads "$\geq 2.8$ to 1" should read --$\geq 2.8$ to 1--.

Column 8, line 8, reads "as recited in claim 11", should read, --as recited in claim 1--.

Signed and Sealed this

Sixth Day of July 1982

[SEAL]

Attest:

GERALD J. MOSSINGHOFF

*Attesting Officer*   *Commissioner of Patents and Trademarks*